(12) United States Patent
    Meacham

(10) Patent No.: US 9,856,981 B2
(45) Date of Patent: Jan. 2, 2018

(54) REDUCED FRICTION PISTON RING

(71) Applicant: G. B. Kirby Meacham, Skaher Heights, OH (US)

(72) Inventor: G. B. Kirby Meacham, Skaher Heights, OH (US)

(*) Notice: Subject to any disclaimer, the term of this patent is extended or adjusted under 35 U.S.C. 154(b) by 0 days.

(21) Appl. No.: 15/146,683

(22) Filed: May 4, 2016

(65) Prior Publication Data

US 2017/0321803 A1    Nov. 9, 2017

(51) Int. Cl.
    *F16J 9/12*     (2006.01)
    *F16J 9/20*     (2006.01)

(52) U.S. Cl.
    CPC ..................... *F16J 9/20* (2013.01)

(58) Field of Classification Search
    CPC .......... F16J 9/00; F16J 9/12; F16J 9/20; F16J 9/203; F16J 9/08
    USPC ........................................................ 277/459
    See application file for complete search history.

(56) References Cited

U.S. PATENT DOCUMENTS

| | | | | |
|---|---|---|---|---|
| 1,916,659 A * | 7/1933 | Dodge | ....................... | F16J 9/20 277/474 |
| 2,267,322 A * | 12/1941 | Bowers | ..................... | F16J 9/20 277/434 |
| 3,174,762 A * | 3/1965 | Hesling | ..................... | F16J 9/00 277/444 |
| 3,851,889 A * | 12/1974 | Nisper | ..................... | F16J 9/20 277/461 |
| 3,917,290 A * | 11/1975 | Geffroy | ................... | F16J 9/203 277/448 |
| 5,169,162 A * | 12/1992 | Azaml | ................. | F04B 39/042 277/465 |
| 2013/0032119 A1 * | 2/2013 | Ma | ........................... | F02F 5/00 123/193.6 |

* cited by examiner

*Primary Examiner* — Nathan Cumar

(57) ABSTRACT

Improved liquid lubricated piston ring gas seals with reduced friction and wear compared to prior art rings are disclosed for use in internal combustion engines, gas pumps, and gas compressors. These improved rings allow independent adjustment of the parameters controlling friction and wear, and eliminate the tradeoff between friction and wear typical of prior art rings.

7 Claims, 9 Drawing Sheets

REDUCED FRICTION PISTON RING

This application is a division claiming priority from U.S. application Ser. No. 14/428,072, filed Mar. 13, 2015.

FIELD OF THE INVENTION

The present invention is directed to piston rings that form sliding seals in pistons operating in cylindrical bores, and more particularly relates to liquid lubricated compression rings used as piston gas seals in internal combustion engines and reciprocating pumps and compressors.

BACKGROUND OF THE INVENTION

The present invention comprises improvements to the reduced friction piston rings described in Meacham WO/2009/033115, which is incorporated by reference in its entirety.

It is generally known to provide liquid lubricated piston ring seals in reciprocating pistons to reduce gas flow through the diametral clearance between the piston and the bore in which it reciprocates.

Compression rings of the type typically used in internal combustion engines are heat and wear-resistant hard materials such as metal, and may have metallic or ceramic coatings to improve their friction and wear properties. Compression rings are generally circular with a rectangular cross section and a small radial gap and are installed in annular grooves in the pistons. Prior to installation the outside diameter of the rings is slightly larger than the inside diameter of the bores. The radial gap allows the rings to be elastically expanded so that they can be installed in the piston grooves. When the pistons are installed in the bores, the rings are elastically compressed to the smaller bore diameter such that the radial gaps are nearly closed. The bore, the cylindrical piston sides, the rings, and the grooves are coated with a thin layer of liquid lubricant, e.g. mineral oil. In the installed condition the rings exert a moderate radial elastic force against the bore surfaces to provide a baseline sealing force. When pressure is applied to a piston and ring assembly, the pressure difference presses the rings against the low-pressure sides of the grooves, and pressurized gas flows into the ring grooves between the piston and the rings. This pressurized gas exerts outward radial force on the rings that augments the elastic baseline force.

The value of the pressure-driven outward radial force is directly proportional to the differential pressure across the ring. The inward balancing force depends on the details of the contact interface acting on a portion of the contact interface areas between the ring and the bore surface. The unbalanced portion of the force is carried as a sliding bearing contact load between the ring and the cylinder bore. At high piston speeds typical of most of the stroke, the ring-bore sliding bearing is supported hydrodynamically on a liquid lubricant film without metal-to-metal contact. Boundary lubrication with metal-to-metal contact occurs as the piston slows and reverses at the stroke ends. This results in much higher friction, and causes most of the ring wear. The simplest case is uniform contact across the entire axial ring thickness. The contact interface area pressure near the edge exposed to the high pressure gas is equal to the high pressure, and the contact interface area pressure near the other edge exposed to the low pressure gas is equal to the low pressure. The pressure at any point between the edges is intermediate between these values. The total inward radial pressure force is less than the outward radial pressure force, and the resultant ring sealing force therefore increases with increasing differential pressure. If the pressure variation between the edges is linear, the inward radial pressure force balances about half the outward radial pressure force. Small changes in variables such as ring twist can make substantial changes in the pressure variation between the edges. Twist that opens a gap towards the high pressure edge increases the total inward radial pressure force. This reduces friction, but may increase blow-by. Twist that opens a gap towards the low pressure edge decreases the total inward radial pressure force. This increases friction and may reduce blow-by. The net outward force on the ring is the vector sum of the outward radial pressure force, the inward radial pressure force, the outward radial ring elastic force and the radial friction force between the sides of the ring and the piston ring groove. This net outward force and the friction coefficient determine the friction between the ring and the bore. If also determines the load supported by the sliding bearing formed by the contact zone between the ring outside diameter and the cylinder bore. The ring friction and wear are critically dependent on the presence of liquid lubricant, the contact zone area, the piston velocity and the net outward force. Conventional piston rings represent a difficult compromise between design parameters to achieve the best possible friction and wear performance for a given application, and a principal feature of this invention is a reduced need to compromise.

Since friction increases with increasing total outward ring radial force, one piston ring design objective is to reduce this force as much as possible consistent with keeping the ring loaded against the bore to maintain a gas seal. The most direct way to reduce the outward ring sealing force of conventional rings is to reduce the ring thickness in the axial direction. This limits the maximum outward pressure force regardless of magnitude of inward balancing force. There are limits, however, on how thin the rings can be made and survive in the engine environment. Further, the top compression ring forms a significant thermal conduction path between the piston and the cooler cylinder bore that is important in keeping the piston cool, and narrow rings reduce the thermal conduction. Consequently, many engine designs have relatively thick robust rings configured such that inward radial pressure force balances a large part of the outward radial pressure force. A variety of ring cross section contours and twist conditions have been proposed to do this. A convex ring barrel bore contact surface with line contact defines the interface areas exposed to high pressure and low pressure precisely. Alternatively a tapered ring outer bore contact surface defines a substantial outer ring area exposed to high pressure during the compression and power strokes. The effective size and position of contact areas defined by convex barrel shapes or tapers are, however, affected by relatively small amounts of ring wear. One solution is application of a hard coating to limit ring wear so that the geometry is maintained during ring break-in and service. Another is to use a ring cross section in which the high pressure interface area is largely defined by a raised flange on the outer bore contact surface, resulting in a design with controlled radial force that is insensitive to ring wear.

The liquid lubricant film has an important effect on piston ring performance. During mid-stroke the high piston velocity causes the liquid lubricant to form a hydrodynamic film between the ring outer bore contact surface and the cylinder bore that prevents metal to metal contact. In this hydrodynamic mode the ring acts as a linear slider bearing of the type described in the Standard Handbook for Mechanical Engineers, 7th Edition, edited by Theodore Baumeister. Page 8-171 (1960) published by the McGraw-Hill Book Company, New York. This lubrication theory indicates that the hydrodynamic coefficient of friction $f_h$ is:

$$f_h \propto \sqrt{\frac{\mu \gamma C}{W}}$$

where $\mu$ is lubricant viscosity, $\gamma$ is piston velocity, C is the bore circumference and W is the radial load supported. $F_h$ is generally low. The coefficient of friction $f_h$ in boundary lubrication increases dramatically because of metal to metal contact between the ring and the bore. Significantly the hydrodynamic coefficient of friction is independent of axial ring bearing contact width. This theory also indicates that the lubricant film thickness $h_o$ is:

$$h_o \propto L\sqrt{\frac{\mu \gamma C}{W}}$$

where L is the axial ring bearing contact width resulting in increased film thickness with increased contact width. The conclusion is that increased axial ring bearing contact width increases the lubricant film thickness at a given piston velocity and lubricant viscosity without increasing the friction coefficient.

As the piston slows and reverses at the stroke ends, the lubricant film thickness $h_o$ decreases, and hydrodynamic lubrication transitions to boundary lubrication with metal to metal contact and increased friction and wear. Increased bearing contact width increases lubrication film thickness $h_o$ and delays the transition to boundary lubrication. Alternatively, increased bearing contact width might be used advantageously to reduce lubricant viscosity rather than delaying the transition to boundary lubrication, allowing reduced friction elsewhere in the engine that more than offsets the increased boundary layer friction of the piston rings.

The transition to boundary lubrication may also be delayed by squeeze film lubrication. Squeeze film lubrication is a transient process in which the lubricant film is squeezed out of the gap between the ring and the cylinder bore as the surfaces approach metal-to-metal contact. The film squeezing process requires a period of time that increases with the initial gap, lubricant viscosity and contact width. This time period extends the effective hydrodynamic lubrication regime and reduces the boundary lubrication regime.

In theory increased contact width maximizes the hydrodynamic bearing regime and minimizes the boundary lubrication regime without changing the friction coefficient at constant lubricant viscosity and radial ring force. The question is how to utilize these effects. Conventional rings with increased contact width, as discussed earlier, tend to have high outward radial pressure force and high friction that negates improved bearing performance. Conventional rings therefore typically compromise towards low contact width to minimize radial force and friction through most of the stroke and accept a certain amount of boundary lubrication sliding and wear at the stroke ends. The objective of this invention is to provide piston ring configurations that effectively increase the bearing area while minimizing the radial ring force and friction, and enhance the squeeze film effect to reduce friction and wear at the stroke ends.

SUMMARY OF THE INVENTION

The present invention is directed to designs and methods for reducing friction and wear of liquid lubricated compression piston ring gas seals. Piston rings according to the invention combine low but well defined outward radial pressure force with increased ring area contacting the bore. The low outward radial pressure force reduces friction throughout the piston motion. The increased ring area contacting the bore extends the hydrodynamic and squeeze film lubrication regime through a larger portion of the piston motion to minimize wear and further reduce friction. Alternatively, the increased ring area contacting the bore may allow reduced liquid lubricant viscosity that reduces friction elsewhere in the engine. The description focuses on compression piston rings for internal combustion engines, but the present invention is applicable to piston rings used in reciprocating piston pumps, gas compressors and other applications using liquid lubricated piston ring gas seals.

According to the invention, the compression piston ring is configured such that the contact interface area between the ring and the bore surface is divided into a seal zone and bearing zones. The seal zone separates high pressure gas on one side of the piston ring from low pressure gas on the opposite side. As with conventional rings, the average gas pressure in the seal zone is intermediate between the high pressure and the low pressure, and generates less inward radial force than if the total seal zone area was exposed to the high gas pressure. The bearing zones are also in contact with the bore, but do not separate high pressure gas from low pressure gas. Instead, each bearing zone is entirely surrounded by gas at a balancing pressure that is approximately the same pressure as the gas under the ring that generates the outward radial pressure force. It therefore generates an inward radial force that counteracts or balances a portion of the outward radial force. The invention includes multiple ways to form seal zones and bearing zones and means of maintaining the gas sealing and bearing functions as the piston tilts in the bore.

The bearing zones are used to control the ring radial pressure force balance as an improved alternative to conventional design features that form annular gaps between the ring and bore to admit gas at the balancing pressure to reduce friction. These conventional design features include chamfers, tapers, convex barrel contact surfaces, ring twist, and recessed faces. Compared to these conventional design features, the use of bearing zones provides more ring bearing area sliding against the bore. This brings several advantages. The bearing zone area supplements the seal zone bearing area, but without increasing the outward radial force. This allows a small seal zone area with low net outward radial force and ring friction, while the larger total bearing area operates at reduced contact pressure and protects the ring, including the seal zone, from excessive wear. Moreover, the fact that the seal zone and bearing zones are defined by distinct geometric features, rather than subtle features such as taper or ring twist, allows consistent performance over a large wear range. Further, the increased contact area results in a thicker hydrodynamic liquid lubricant film and larger squeeze film lubrication effect that reduces friction and wear at the stroke ends. Finally, the increased contact area also enhances heat transfer from the ring and piston to the cylinder bore, thereby reducing thermal stress on the piston, rings and lubricant. Altogether, these factors may reduce wear and minimize the need for hard wear-resistant coatings.

DESCRIPTION OF DRAWINGS

The appended claims set forth those novel features that characterize the invention. However, the invention itself, as well as further objects and advantages thereof, will best be understood by reference to the following detailed description of preferred embodiments. The accompanying drawings, where like reference characters identify like elements throughout the various figures in which:

DETAILED DESCRIPTION OF THE INVENTION

Upon examination of the following detailed description the novel features of the present invention will become apparent to those of ordinary skill in the art or can be learned by practice of the present invention. It should be understood that the detailed description of the invention and the specific examples presented, while indicating certain embodiments of the present invention, are provided for illustration purposes only. Various changes and modifications within the spirit and scope of the invention will become apparent to those of ordinary skill in the art upon examination of the following detailed description of the invention and claims that follow.

The prior art and the invention are described with reference to internal combustion engines, but it is to be understood that the invention is applicable to liquid lubricated piston ring gas seals in other applications including gas compressors. In the description "upper", "top", "above" and "head" refer to the direction towards the combustion chamber, and "lower" and "downward" refer to the direction towards the crankcase.

The description focuses on the effects of pressure and friction forces and piston tilt on the rings. It is recognized that inertial forces are also present, but these are not central to the invention and are included in the description only in relation to ring lift. Further the description is limited to the compression and expansion strokes wherein high gas pressures occur above liquid lubricated compression piston rings, generating high pressure-driven radial contact forces and resulting ring friction and wear. Intake and exhaust strokes are not discussed because the low pressures generate only small pressure-driven radial contact forces.

Figure 1:
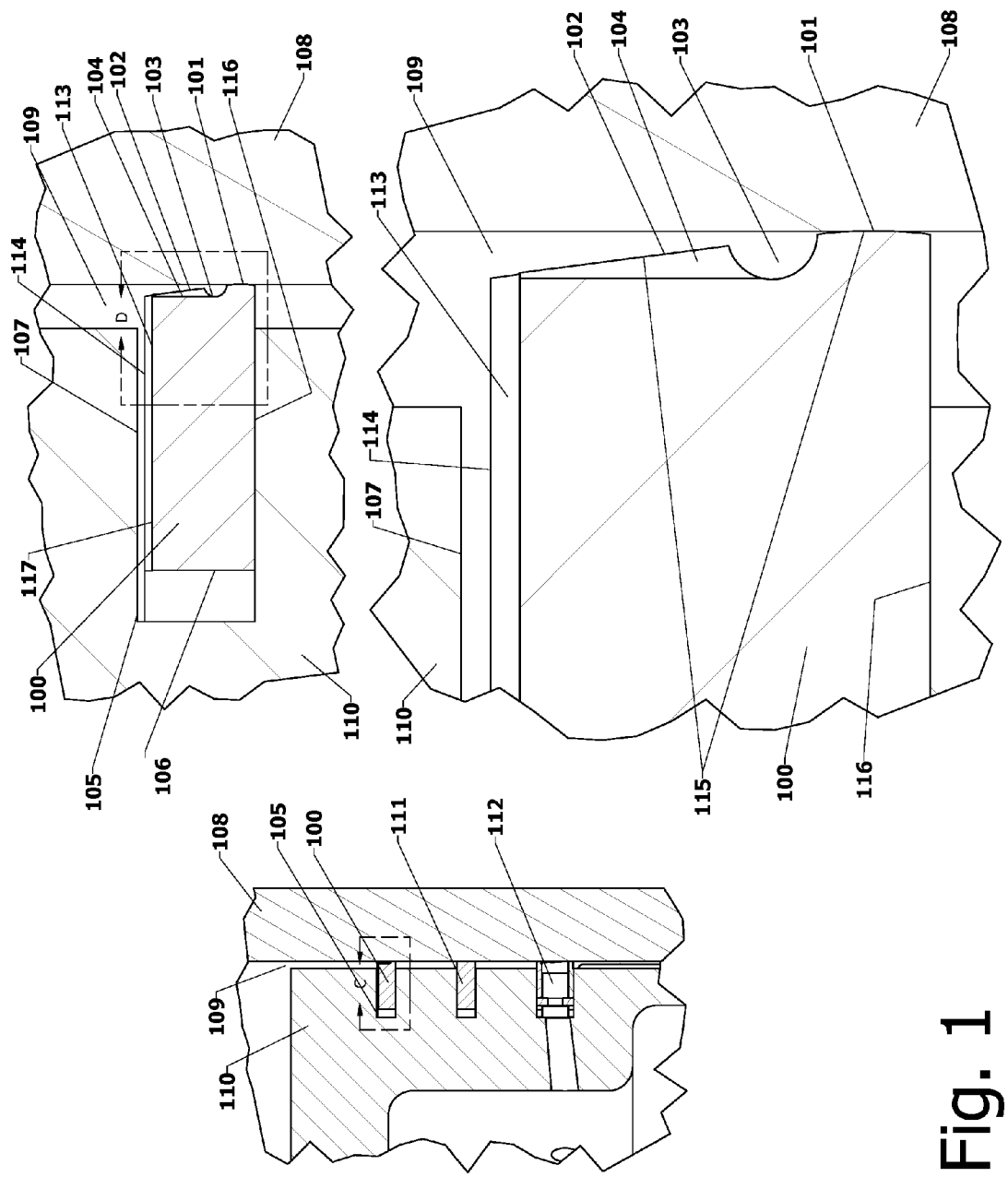
FIG. 1 illustrates a one-piece reduced friction ring in an internal combustion engine.
Figure 2:
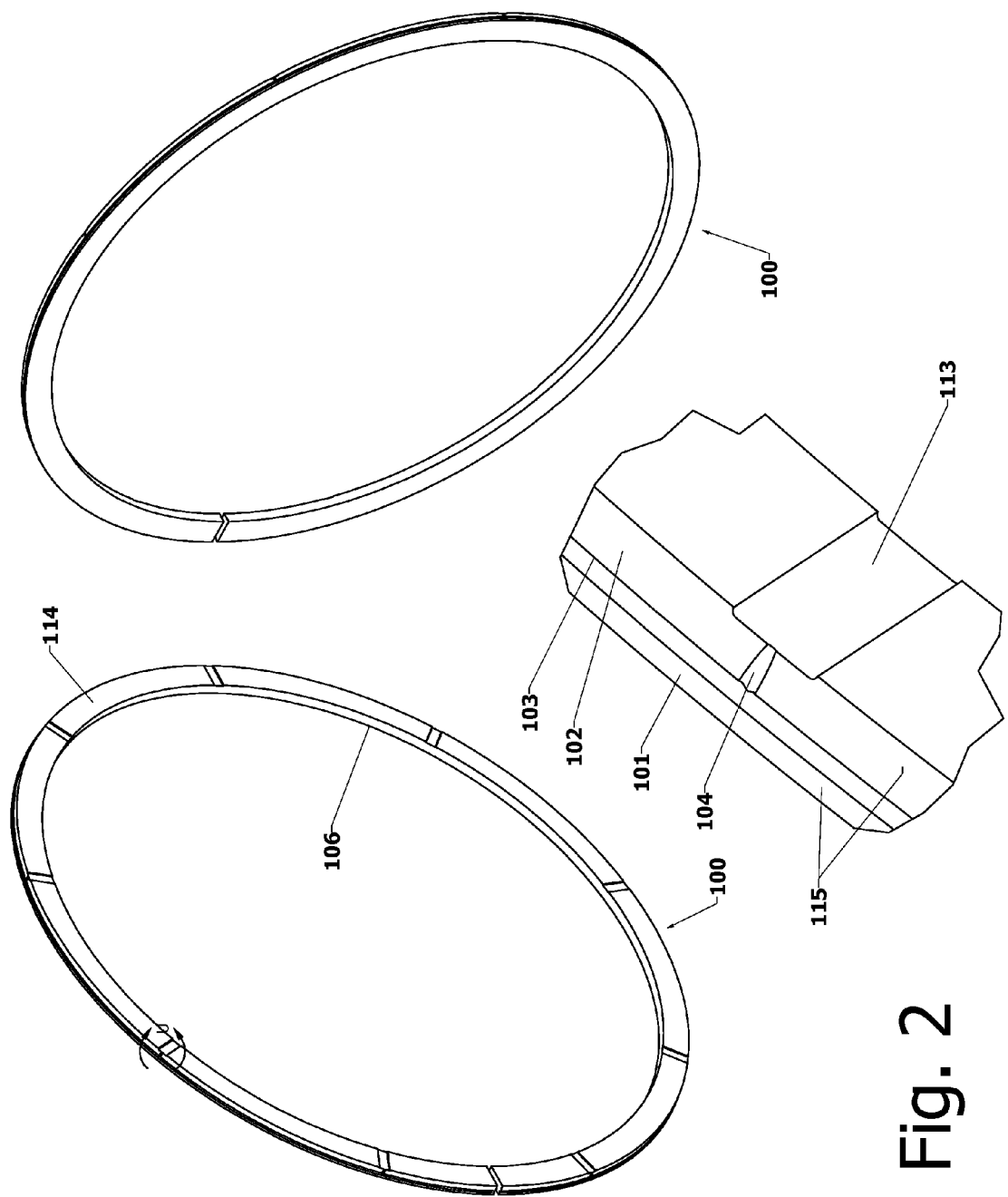
FIG. 2 provides perspective views of the one-piece reduced friction piston ring.
Figure 3:
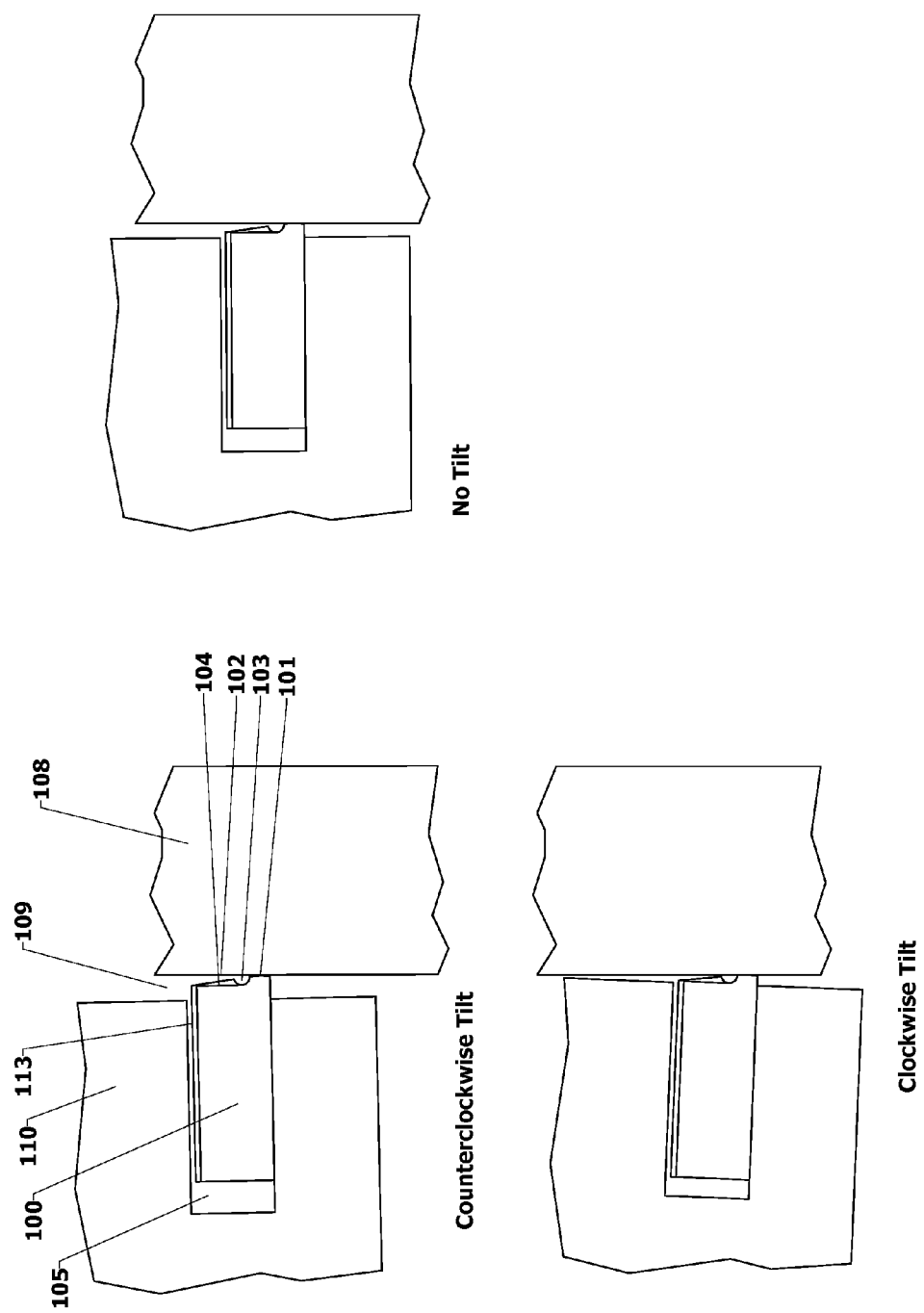
FIG. 3 illustrates the function of the one-piece ring as the piston tilts in the bore.

FIG. 1, FIG. 2 and FIG. 3 show a first improved version of a one-piece reduced friction pressure balanced top compression ring described in detail in Meacham WO/2009/033115. The ring 100 is installed in the top groove 105 of the piston 110 such that it slides against the cylinder bore 108 and forms a seal blocking high pressure gas 109 from flowing through the clearance between the piston 110 and the bore 108. The piston typically also employs a second compression ring 111 and an oil control ring 112 in lower grooves. As with the original version, the new ring 100 has a seal zone 101 and a bearing zone 102 on the ring outside diameter separated by a circumferential groove 103, where this groove is connected to the top of the ring by axial grooves 104 crossing the bearing zone. The axial grooves allow gas 109 at cylinder pressure to flow to the circumferential groove 103, so groove 103 is at approximately the same pressure as the piston groove 105 and the inside diameter 106 of the ring, which are also exposed to gas at cylinder pressure.

As pressure rises in the cylinder, ring 100 is pushed down against the lower flank 116 of the piston groove 105. The clearance between the upper piston groove flank 107 and the top ring surface 114 allows gas 109 to flow into the piston groove and pressurize the inside diameter 106 of the ring, creating an outward radial force pressing the ring 100 against the cylinder bore 108. Since the axial grooves 104 cause the circumferential groove 103 pressure to be approximately equal to the pressure in the ring groove 105, the interface pressure between the bearing zone 102 outside diameter and the cylinder bore 108 is approximately equal to the cylinder pressure 109 contacting the ring inner diameter 106. The effect of this interface pressure is to generate an inward radial force that partially balances the outward radial force on the ring, with the result that the bearing zone 102 does not contribute to the pressure driven outward radial force and friction of the ring. The only radial pressure force is generated by the seal zone 101, and this is low when the seal zone is narrow. The bearing zone 102, however, carries a portion of the radial force generated in the seal zone 101. Since the bearing zone 102 is relatively wide, it maintains hydrodynamic lubrication over a larger part of the engine cycle and reduces friction and wear. It also improves heat transfer between the ring and piston assembly and the cylinder bore.

One improvement in the design shown in FIG. 1 and FIG. 2 is an optional array of radial vent grooves 113 in the top face of the ring to increase the flow rate of gas into the ring groove to more closely match the pressure rise rate in the bearing zone without increasing the mechanical clearance of the ring in the groove. This is advantageous since it minimizes the possibility of transient ring collapse and seal leakage caused by a faster pressure rise in the bearing zone 102 than the inside ring diameter 106.

The second improvement is a contour on the outside diameter 115 of the ring 100 that optimizes sealing performance as the piston 110 tilts in the bore 108. The seal zone 101 has a barrel shaped contour, and the bearing zone 102 has a tapered contour where the taper half-angle is equal to or greater than the maximum piston tilt. The taper and barrel contours are dimensioned such that if the taper were extended down across the circumferential groove 103 it would be tangent to the upper edge of the seal zone barrel contour. This geometry allows the seal zone 101 to remain in contact with the bore 108 as the piston 110 tilts. It should be noted that the taper and barrel contours shown in the illustrations are exaggerated to clarify the principle. The actual taper is on the order of 1 to 2 microns per millimeter of bearing zone width.

The arrangement provides a seal ring with well-defined bearing and seal zones that can be separately optimized. The sealing zone may be very narrow to reduce the outward radial pressure force and friction, while a wide bearing zone can be used to increase the hydrodynamic bearing oil film thickness and reduce metal-to-metal contact and resulting friction and wear.

The combination of a barrel shape in the sealing zone 101 and a tangential taper in the bearing zone 102 maintains a seal under tilt conditions as illustrated in FIG. 3. The minimum clearance between the ring 100 and the cylinder bore 108 is in the seal zone 101, and clearance increases by a few microns in the tapered bearing zone 102. This prevents contact between the bearing zone 102 and the cylinder bore 108 from lifting the seal zone from the cylinder bore and increasing blow-by as the piston 110 tilts. The taper is small enough that the bearing zone is still effective as a hydrodynamic slider bearing. It does, however, limit the ability of the bearing zone 102 to protect the seal zone 101 from wear in boundary lubrication conditions.

Cylindrical seal and bearing zones that allow a small amount of seal zone lift with piston tilt are an alternative that maximizes the bearing performance and wear resistance of the ring assembly at the expense of increased blow-by. The blow-by increase is expected to be small. A one micron gap on one side of a 75 millimeter bore piston forms a flow area of 0.12 square millimeters, equivalent to a 0.4 millimeter round hole. This is a small leak that only occurs during piston tilt, so it may a good trade-off for some applications.

Manufacturing tolerances are optimized for this one-piece ring configuration so that the seal zone 101 outside diameter extends radially beyond the bearing zone 102 outside diameter at the initial assembly of the piston 110 in the bore 108 to assure good sealing. The seal zone 101 will wear slightly during engine break-in and allow the bearing zone 102 to share more of the radial load.

In addition to carrying part of the seal zone 101 radial pressure load to reduce wear, the bearing zone 102 shields the narrow seal zone from direct contact with the high temperature combustion gas 109. Instead, the gas flows through the small axial grooves 104 across the bearing zone 102 and is cooled before contacting the seal zone 101. This shielding is expected to improve the seal zone durability since it reduces its operating temperature. The bearing zone 102 also contributes to heat transfer from the piston 110, since it has a relatively large area in contact with the piston bore.

Figure 4:
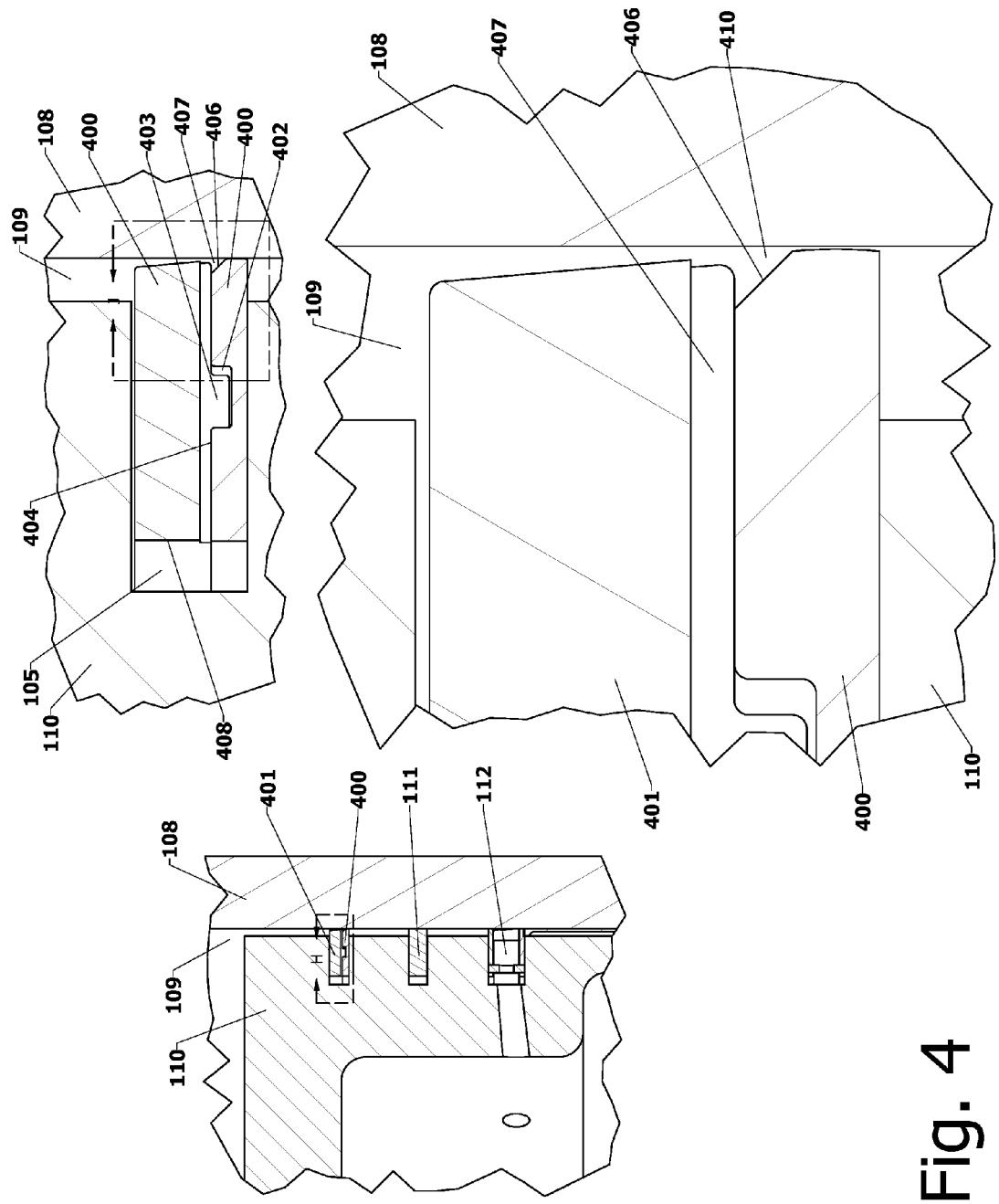
FIG. 4 illustrates a two-piece reduced friction ring in an internal combustion engine.
Figure 5:
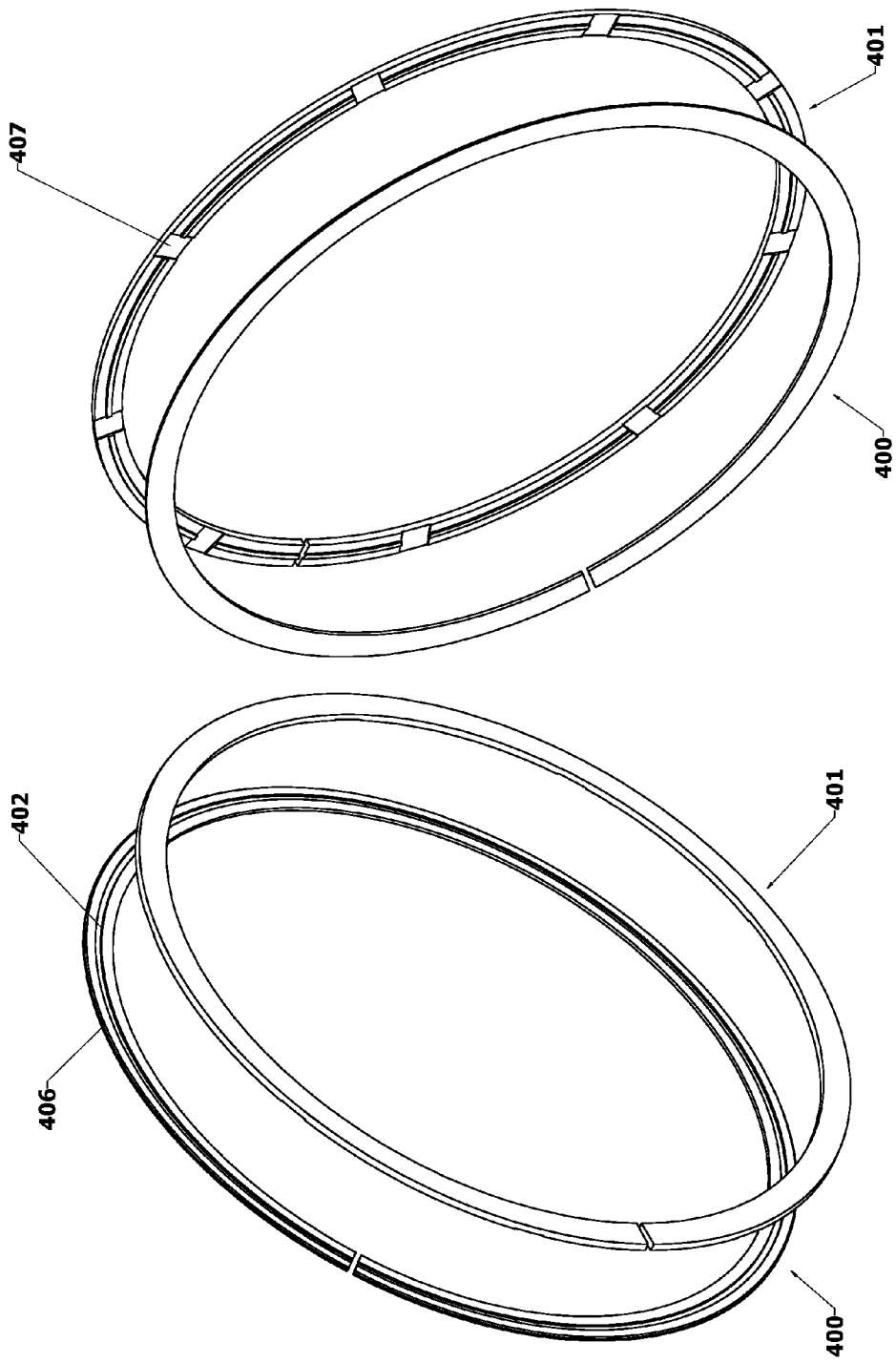
FIG. 5 provides perspective views of the two-piece reduced friction piston ring.
Figure 6:
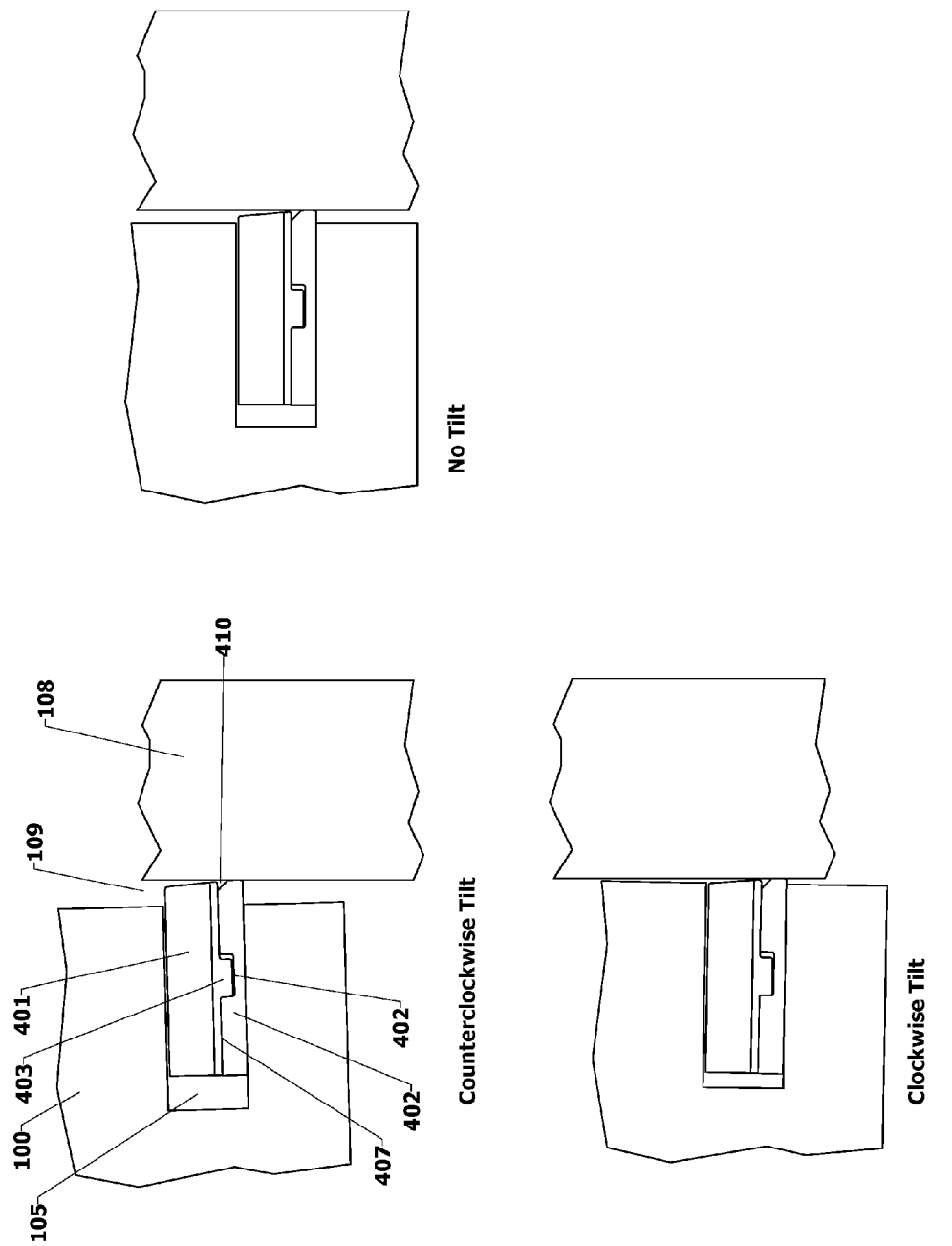
FIG. 6 illustrates the function of the two-piece ring as the piston tilts in the bore.

FIG. 4, FIG. 5 and FIG. 6 show a second improved version of the one-piece reduced friction pressure balanced top compression ring described in detail in Meacham WO/2009/033115. Installation and function of this two-piece ring assembly is the same in many respects as the one-piece ring 100 described with respect to FIG. 1, FIG. 2 and FIG. 3, and only differences will be described in detail. The ring is an assembly of a seal ring 400 and a bearing ring 401. The two rings interlock via a circumferential groove 402 on an inner face 404 of the seal ring 400 and a mating lug 403 on the adjacent face 405 of the bearing ring 401 so that the two rings act as a single unit when assembled into the piston groove 105. Radial pressure load is thereby transferred from the seal ring 400 to the bearing ring 401. A chamfer 406 on the upper outside diameter of the seal ring forms a circumferential volume 410 between the seal ring and the bearing ring. Radial vent grooves 407 in the bearing ring 401 provide gas flow passages from the ring inner diameter 408 to the outer diameter 409 so that the circumferential volume 410 formed by the seal ring chamfer is held at a value approximately equal to the pressure in the piston groove 105 acting on the ring inner diameter 408. The circumferential volume 410 has the same function as the circumferential groove 103 in the first ring 100, and the radial vent grooves have a similar function as the axial vent grooves 104. The principal difference is that the gas providing the balancing pressure in the circumferential volume 410 flows from the piston groove 105, and the pressure rise in this volume will lag the rise in cylinder pressure 109. This in turn assures that the pressure rise in the bearing zone 401 lags the pressure rise in the piston groove 105, which is advantageous since it minimizes the possibility of transient ring collapse and seal leakage caused by a faster pressure rise in the bearing zone 401 than in the piston groove 105.

The lug 403 and groove 402 are positioned at the neutral axis of each ring to minimize ring twist effects when the rings are elastically bent to provide the baseline radial force against the bore surface. It also minimizes stress concentrations or ring distortions caused by the periodic radial vent grooves 407 in the seal ring 400 circumferential lug 403. If a twist bias is needed, it may be added in the conventional manner by chamfering the ring inside diameter.

The contours on the outside diameters of the seal ring 400 and bearing ring 401 combine to provide the same function as the contours of the one-piece ring 100 to optimize sealing performance as the piston tilts in the bore. The seal ring 400 has a barrel shaped contour, and the bearing ring 401 has a tapered contour. Cylindrical seal and bearing zones that allow a small amount of seal zone lift with piston tilt are also an alternative to maximize the bearing performance and wear resistance of the ring assembly at the expense of increased blow-by. In this case the initial dimensions of the rings should favor contact between the seal ring 400 and the bore 108, allowing break-in wear to bring the bearing ring 401 into full contact. The heat transfer and heat shielding characteristics of the one-piece and two-piece variations are also similar.

There are additional differences between the one-piece and two-piece variations. The seal ring 400 and the bearing ring 401 may be made of different materials to optimize the cost and performance of the assembly. The seal ring, for example, might be nitrided steel for high strength, while the bearing ring might be cast iron for good lubricity and low wear. Also, the two-piece ring assembly has reduced axial ring lift caused by inertial forces than a one-piece ring, since the seal ring 400 has lower mass. The bearing ring 401 may lift, leaving the seal ring in contact with the lower groove face.

Figure 7:
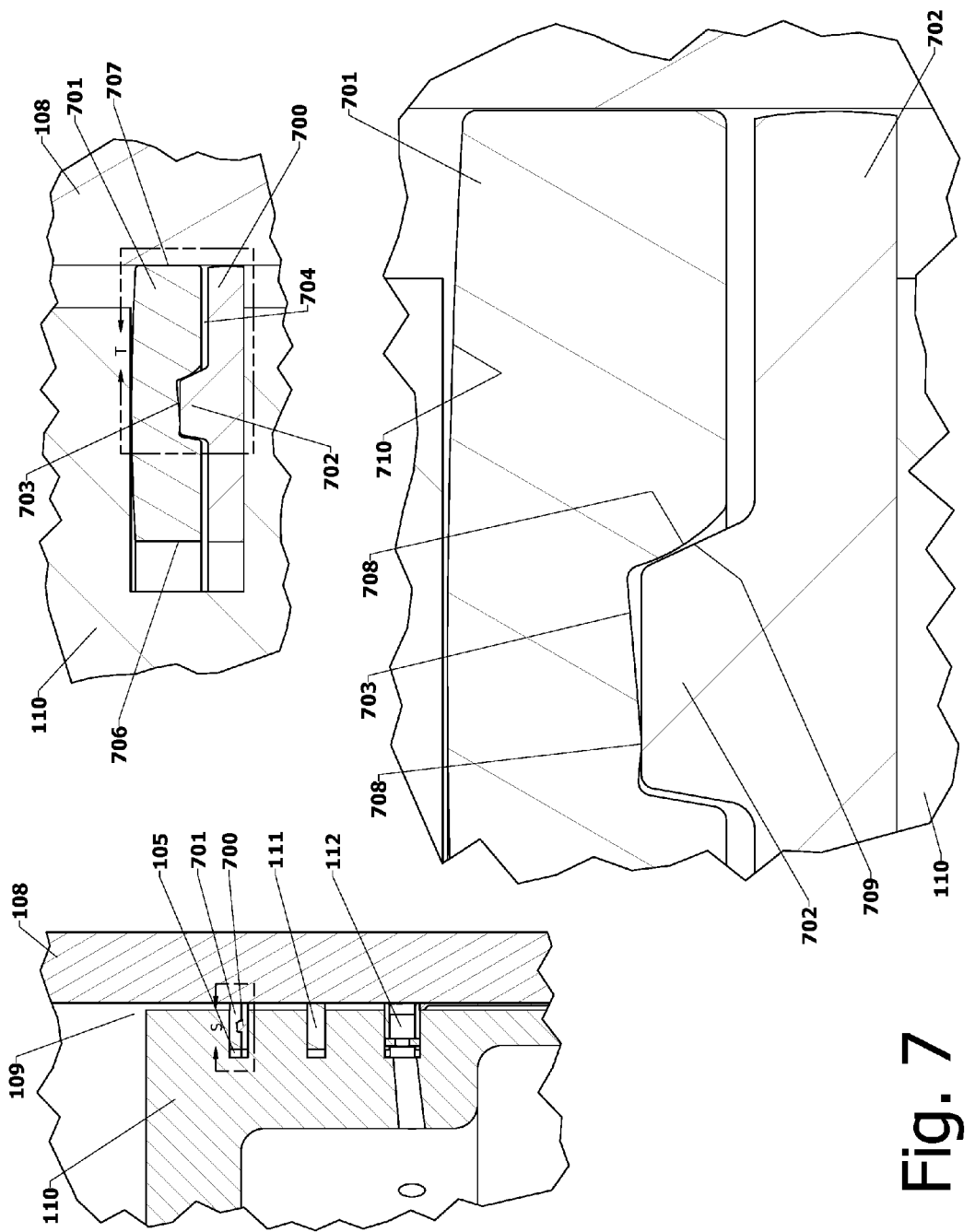
FIG. 7 illustrates an articulated two-piece reduced friction ring in an internal combustion engine.
Figure 8:
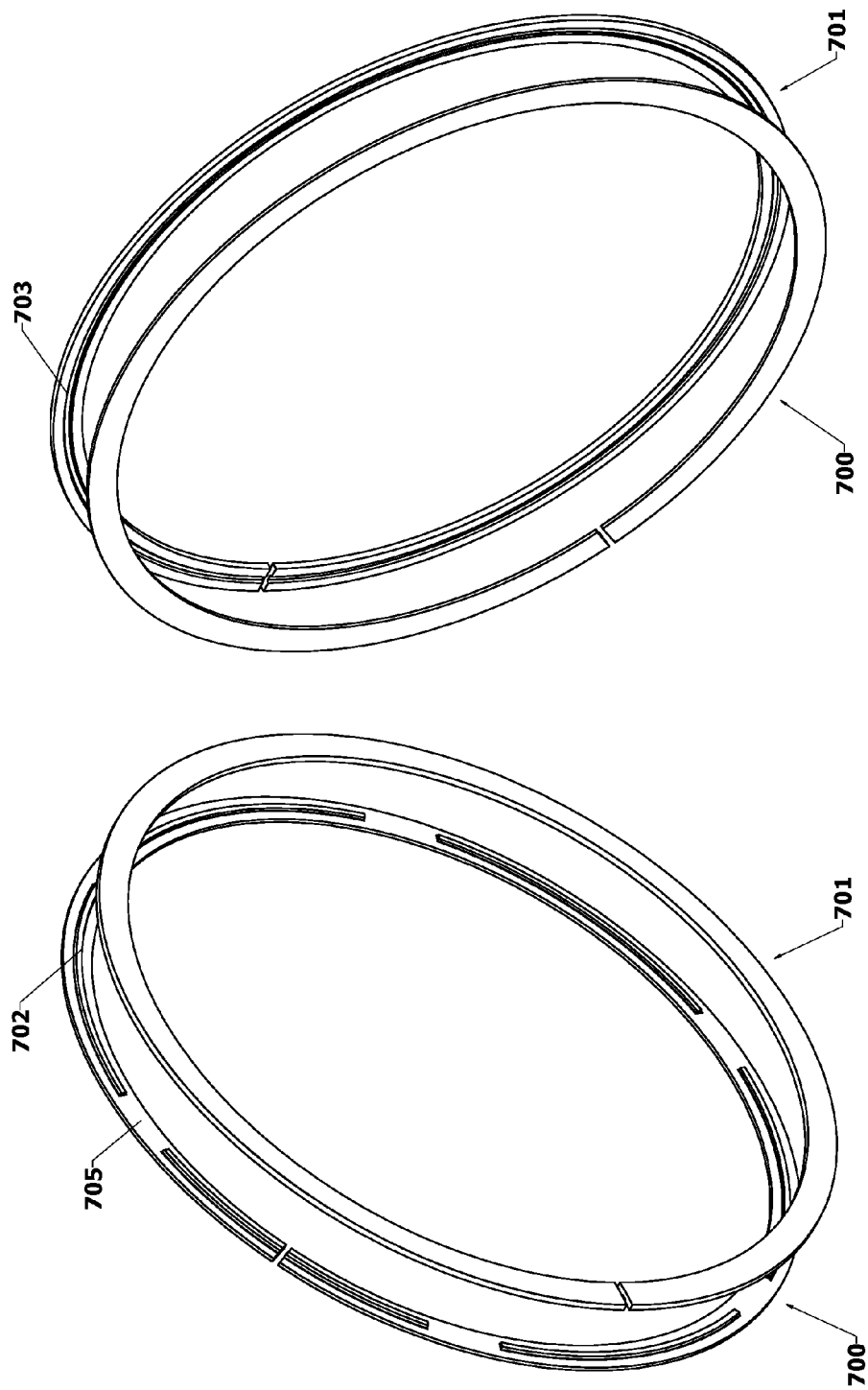
FIG. 8 provides perspective views of the articulated two-piece reduced friction piston ring.
Figure 9:
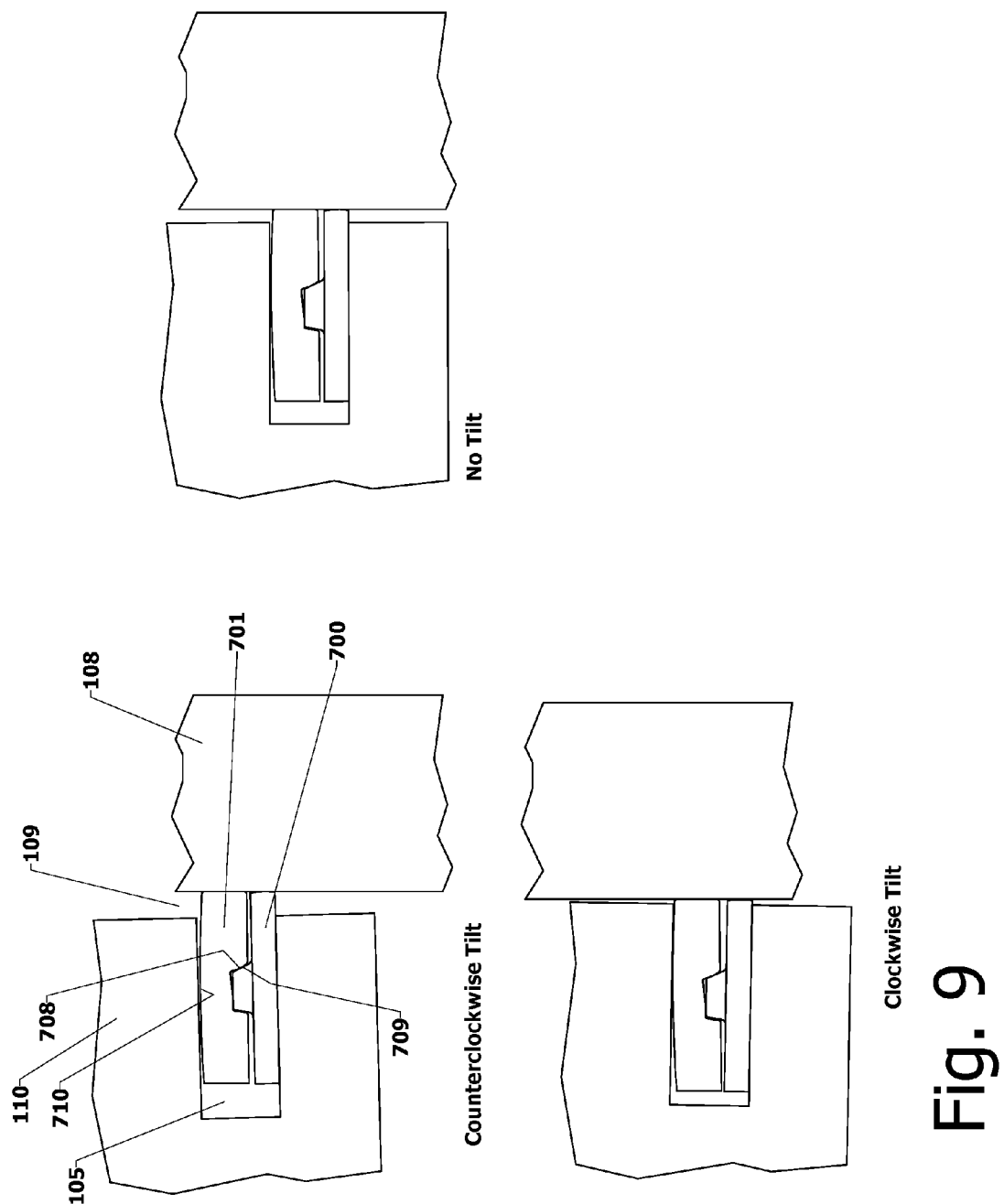
FIG. 9 illustrates the function of the articulated two-piece ring as the piston tilts in the bore.

FIG. 7, FIG. 8 and FIG. 9 show a third improved version of the one-piece reduced friction pressure balanced top compression ring described in detail in Meacham WO/2009/033115. Installation and function of this two-piece ring assembly is the same in many respects as the one-piece ring and the two-piece ring described with respect to FIG. 1 through FIG. 6, and only differences will be described in detail. The two-piece articulated pressure balanced ring accommodates piston tilt by providing a separate seal ring 700 and bearing ring 701 that move relative to each other to optimize both bearing and sealing performance as the piston tilts. A circumferential lug 702 on the top side of the seal ring portion of the assembly engages a circumferential groove 703 in the bottom side of the bearing ring 701 to transfer radial pressure loading on the seal ring 700 to the bearing ring 701. The lug 702 also acts as an axial spacer to form an axial gap 704 between the seal and bearing rings. This gap, combined with periodic radial notches 705 in the seal ring circumferential lug 702, provides gas flow paths from the inner diameter 706 of the ring assembly to the lower edge of the bearing ring 701 outer diameter 707 to provide the pressure balancing function. Further, the lug and groove connection between the seal ring 700 and bearing ring 701 allows articulation of the assembly such that the seal ring 700 follows the piston tilt to maintain a tight seal and the bearing ring 701 rocks within the piston groove 105 to align with the bore 108 to carry radial force. An optional crown radius 710 on the upper face of the bearing ring 701 allows it to rock within the piston groove 105, while maintaining minimal axial clearance of the ring assembly within the piston groove.

The lug 702 and groove 703 are shaped to provide pivot and cam functions that maintain an optimal geometric relationship between the two rings 700 and 701, the piston 110 and the bore 108 over the range of piston tilt. A circumferential pivot 708 is formed in the top of the bearing ring groove 703, and bears on the top of the seal ring lug 702 to allow the bearing ring 701 to rock relative to the seal ring 700 while defining the center of rotation. The outer diameter of the lug 702 and the outer diameter of the groove 703 are shaped such that they engage as a cam 708 and follower 709 to adjust the relative radial position of the seal ring 700 as the bearing ring 701 rocks.

This articulation action is shown in FIG. 9. Gas pressure keeps the seal ring 700 loaded against the lower piston groove face 106 as the piston tilts, and the large barrel radius on the outer diameter 706 maintains a good seal as the seal ring 700 and piston 110 tilt together. At the same time the radial spring force of the bearing ring 701 plus the radial pressure loading transferred from the seal ring 700 keeps the bearing ring aligned with the cylinder bore 108. This requires the bearing ring 701 to rock within the groove 105, and the crown 710 on the upper face of the bearing ring 701 allows this rocking motion. With counterclockwise rotation of the piston 110 the cam 708 and follower 709 move relative to one another to pull in the seal ring 700 relative to the bearing ring 701 to maintain the radial pressure load transfer to the bearing ring. With clockwise rotation of the piston 110 the cam 708 and follower 709 move relative to one another to allow the seal ring 700 relative to move out relative to the bearing ring 701 and maintain sealing contact with the cylinder bore 108. It should be noted that the radial adjustments are in the opposite directions on the opposite sides of the tilted piston 110. Since the seal ring 700 is aligned with the piston groove 105 and the bearing ring 701 is aligned with the bore 108, neither ring has to twist as the piston tilts.

The heat transfer and heat shielding characteristics of the two-piece articulated pressure balanced ring assembly are similar to the one-piece and non-articulated two-piece ring variations. It shares the improved axial ring lift and radial collapse characteristic of the non-articulated two-piece ring variations, as well as the ability to manufacture the seal ring 700 and the bearing ring 701 from different materials. Further, the seal ring lug 702 and the bearing ring groove 703 are also on the neutral axis to avoid unwanted twist. As with the ring variations discussed previously, manufacturing tolerances should be adjusted to assure initial contact and sealing between the seal ring 700 and the bore 108, with the bearing ring sharing increasing load during break-in.

The invention claimed is:

1. A two-piece liquid lubricated gas seal assembly for internal combustion engines, gas pumps and gas compressors for use in a piston; wherein the two pieces are axially stacked diametrically expandable rings, and together comprise an outside diameter, an inside diameter, and upper and lower faces substantially perpendicular to the piston ring axis;

the piston has an annular ring groove comprising an upper flank, a lower flank and a bottom, and the piston is axially reciprocated in a bore;
the piston ring assembly is disposed in the ring groove such that the outside diameters of the two rings comprising the gas seal assembly are in liquid lubricated axial sliding contact with the cylinder bore surface, the inside diameters spaced away from the groove bottom, and the gas seal assembly upper and lower faces are adjacent the upper and lower groove flanks respectively;
the annular space between the gas seal assembly inner diameter and the groove bottom is in fluid communication with the gas above the ring such that its pressure is substantially equal to the gas pressure above the gas seal assembly;
at least one of the two rings comprising the gas seal assembly incorporates geometric features that axially separate the outside diameters of the two rings such that an annular fluid passage is defined by a gap between the upper and lower rings and the cylinder bore surface, wherein said annular fluid passage is in fluid communication with the gas above the gas seal such that its pressure is substantially equal to the gas pressure above the gas seal;
the generally cylindrical lower ring serving a gas sealing function and the generally cylindrical upper ring serving a slider bearing function; and
the two rings incorporate means to mechanically interlock with each other, restricting radial motion between the rings such that outward radial gas pressure load on the gas seal ring is transferred to the slider bearing ring, the interlocking means comprising a circumferential lug on the face of one ring engaging a circumferential groove on the adjacent face of the other ring, wherein cam, pivot and follower action at the contact zone between the circumferential lug and the circumferential groove results in radial motion of the upper slider bearing ring relative to the lower gas seal ring as a function of a tilt angle between the rings, such that this cam and follower action causes outward radial motion of the upper slider bearing ring relative to the lower gas seal ring as a function of a tilt angle between the rings that decreases the axial spacing of the outer diameters of the two rings, and results in inward radial motion of the upper slider bearing ring relative to the lower gas seal ring as a function of a tilt angle between the rings that increases the axial spacing of the outer diameters of the two rings.

2. The piston ring gas seal according to claim 1 wherein the annular fluid passage is in fluid communication with the gas above the ring through one or more axial grooves traversing the upper bearing slider ring outside diameter bearing zone.

3. The piston ring gas seal according to claim 1 wherein the annular fluid volume is in fluid communication with the gas in the annular space between the piston ring inner diameter and the groove bottom through one or more radial vent grooves in the circumferential lug.

4. The piston ring gas seal according to claim 1 wherein the circumferential lug and the circumferential groove are positioned approximately midway between the inner and outer ring diameters such that they are near a principal neutral axis of the cross sections of the two rings comprising the ring assembly, wherein this neutral axis is generally perpendicular to the plane of the ring.

5. The piston ring gas seal according to claim 1 wherein the geometrical relation between the rings and the piston groove in which they are disposed permits rotation of the upper slider bearing ring such that alignment with the bore is allowed over the total range of piston tilt.

6. The piston ring gas seal according to claim 1 wherein the geometrical relation between the rings and the piston groove that permits upper slider bearing rotation includes added axial clearance between the upper slider bearing ring and the upper flank of the piston groove.

7. The piston ring gas seal according to claim 1 wherein the geometrical relation between the rings and the piston groove that permits upper slider bearing rotation includes a crown radius on the upper face of the bearing ring.

* * * * *